United States Patent
O'Sullivan et al.

(10) Patent No.: US 7,758,832 B2
(45) Date of Patent: Jul. 20, 2010

(54) METHOD OF DECOMPOSING NITROGEN DIOXIDE

(75) Inventors: Richard Dominic O'Sullivan, Nr Royston (GB); Peter Werth, Bad Soden-Salmünster (DE)

(73) Assignee: Johnson Matthey Public Limited Company, London (GB)

( * ) Notice: Subject to any disclaimer, the term of this patent is extended or adjusted under 35 U.S.C. 154(b) by 117 days.

(21) Appl. No.: 11/665,308

(22) PCT Filed: Oct. 10, 2005

(86) PCT No.: PCT/GB2005/003899

§ 371 (c)(1),
(2), (4) Date: Jan. 29, 2008

(87) PCT Pub. No.: WO2006/040533

PCT Pub. Date: Apr. 20, 2006

(65) Prior Publication Data

US 2008/0213145 A1    Sep. 4, 2008

(30) Foreign Application Priority Data

Oct. 12, 2004 (GB) .................... 0422549.6

(51) Int. Cl.
*B01D 53/56* (2006.01)
*B01D 53/94* (2006.01)
*C01B 21/24* (2006.01)
*F01N 3/10* (2006.01)

(52) U.S. Cl. .............. 423/213.2; 423/213.5; 423/213.7; 423/239.1; 423/239.2; 423/245.3; 180/313; 60/299

(58) Field of Classification Search .............. 60/299; 180/313; 423/213.2, 213.5, 213.7, 239.1, 423/239.2, 245.3
See application file for complete search history.

(56) References Cited

U.S. PATENT DOCUMENTS 4,902,487 A    2/1990    Cooper et al.

(Continued)

FOREIGN PATENT DOCUMENTS

CA    2159956 A1    4/1996

(Continued)

OTHER PUBLICATIONS

California's Diesel Risk Reduction Program, Sep. 2000, Title 13, California Code of Regulations, Chapter 14, Section 2706.

(Continued)

*Primary Examiner*—Timothy C Vanoy
(74) *Attorney, Agent, or Firm*—RatnerPrestia

(57) ABSTRACT

A method of decomposing $NO_2$ to NO in an exhaust gas of a lean-burn internal combustion engine comprises the steps of contacting an acidic metal oxide selected from the group consisting of zeolites, tungsten-doped titania, silica-titania, zirconia-titania, and mixtures of any two or more thereof with a gas mixture comprising the exhaust gas, adjusting the composition of the gas mixture, by injecting hydrocarbon therein at a rate that changes over the course of a duty cycle so that, on average over the duty cycle, the C1 hydrocarbon:nitrogen oxides ratio of the gas mixture contacting the acidic metal oxide is from 0.1 to 2.0 and passing the effluent gas directly to atmosphere optionally via first contacting the gas mixture with a hydrocarbon oxidation catalyst.

22 Claims, 1 Drawing Sheet

U.S. PATENT DOCUMENTS

| | | | |
|---|---|---|---|
| 5,524,432 A | 6/1996 | Hansel | |
| 5,746,989 A | 5/1998 | Murachi et al. | |
| 5,776,423 A | 7/1998 | Feeley et al. | |
| 5,788,936 A * | 8/1998 | Subramanian et al. | ... 423/213.2 |
| 6,202,407 B1 | 3/2001 | Brusasco et al. | |
| 6,314,722 B1 | 11/2001 | Matros et al. | |
| 2002/0029564 A1* | 3/2002 | Roth et al. | ............ 60/286 |
| 2002/0197191 A1 | 12/2002 | Takeshima et al. | |
| 2004/0045285 A1* | 3/2004 | Penetrante et al. | ............ 60/286 |
| 2004/0187456 A1 | 9/2004 | Bruck | |

FOREIGN PATENT DOCUMENTS

| | | |
|---|---|---|
| EP | 0 341 832 A2 | 11/1989 |
| EP | 0 541 271 A1 | 5/1993 |
| EP | 0 709 129 A1 | 5/1996 |
| EP | 0 758 713 A1 | 2/1997 |
| EP | 0 888 816 A1 | 1/1999 |
| EP | 1 057 519 A1 | 12/2000 |
| JP | 8-103656 A | 4/1996 |
| JP | 2722987 | 11/1997 |
| JP | 11-47605 | 2/1999 |
| JP | 11-300211 | 11/1999 |
| JP | 2000-97016 A | 4/2000 |
| JP | 2000-199423 A | 7/2000 |
| JP | 2002-35587 A | 2/2002 |
| WO | WO-98/40153 | 9/1998 |
| WO | WO-02/31325 A1 | 4/2002 |
| WO | WO-03/033118 A1 | 4/2003 |
| WO | WO-03/037507 A1 | 5/2003 |
| WO | WO-03/038248 | 5/2003 |
| WO | WO-2004/030798 A1 | 4/2004 |
| WO | WO-2004/094045 A1 | 11/2004 |

OTHER PUBLICATIONS

Office Action mailed May 14, 2009 in U.S. Appl. No. 10/553,490.

Barry J. Cooper et al., "Role of NO in Diesel Particulate Emission Control," SAE Paper No. 890404, Feb. 1989.

Final Office Action of Mar. 16, 2010, from U.S. Appl. No. 10/553,490.

* cited by examiner

METHOD OF DECOMPOSING NITROGEN DIOXIDE

This application is the U.S. National Phase application of PCT International Application No. PCT/GB 2005/003899, filed Oct. 10, 2005, and claims priority of British Patent Application No. 0422549.6, filed Oct. 12, 2004.

FIELD OF THE INVENTION

The present invention relates to a method of decomposing nitrogen dioxide to nitrogen monoxide in an exhaust gas of a lean-burn internal combustion engine.

BACKGROUND OF THE INVENTION

Nitrogen oxides ($NO_x$) comprise nitrogen monoxide (NO) and nitrogen dioxide ($NO_2$). Reference herein to $NO_x$ is to a mixture of nitrogen oxides including NO and $NO_2$, and references herein to NO and $NO_2$ specifically should be interpreted accordingly.

In our International patent application no. PCT/GB2004/001680 (the entire contents of which are incorporated herein by reference) we describe a novel method of decomposing $NO_2$ to NO in an exhaust gas of a lean-burn internal combustion engine, which method comprising adjusting the C1 hydrocarbon:nitrogen oxides (C1 HC:$NO_x$) ratio of the exhaust gas to from 0.1 to 2.0 and contacting the gas mixture with an acidic metal oxide selected from the group consisting of zeolites, tungsten-doped titania, silica-titania, zirconia-titania, gamma-alumina, amorphous silica-alumina and mixtures of any two or more thereof, and passing the effluent gas to atmosphere.

One application of such a method is to decompose $NO_2$ generated over an oxidation catalyst or a catalysed soot filter before the exhaust gas is passed to atmosphere. Such an application is often described as a "clean-up" catalyst. In one embodiment described in PCT/GB 2004/001680, the oxidation catalyst is a NO oxidation catalyst in Johnson Matthey's CRT® system described in EP 0341832 or U.S. Pat. No. 4,902,487 (both of which are incorporated herein by reference) for oxidising NO to $NO_2$ for combusting particulate matter (PM) collected on a filter in $NO_2$ and the clean-up catalyst is located downstream of the filter, or on the downstream end of the filter. The CRT® filter can also contain a precious metal catalyst to promote PM combustion.

In PCT/GB2004/001680 we explain our belief that the HC reductant is forming a coke on the acidic metal oxide and it is the coke that, at least in part, promotes the decomposition of $NO_2$ to NO.

EP 0541271 (incorporated herein by reference) discloses a catalyst system for treating $NO_x$ in the exhaust from a lean-burn gasoline-fuelled engine, which system comprising a first stage catalyst containing a transition metal-exchanged zeolite (i.e. Cu-ZSM5), and a second stage catalyst, which is a three-way catalyst, for treating the effluent from the first stage catalyst. The engine is controlled such that the ratio of $NO_x$ to HC in the exhaust gas is in the range of from 1/3 to 3/1 (i.e. minimum $C_3H_6$ of 250 ppm (or 750 ppm C1) and a minimum $NO_x$ of 200-400 ppm). EP 0541271 does not disclose the method of PCT/GB2004/001680 because the effluent gas of the first stage catalyst undergoes further treatment in the second stage catalyst, whereas the effluent gas of the method of PCT/GB2004/001680 is passed to atmosphere. Moreover, preferably the method of PCT/GB2004/001680 is for treating exhaust gas from a diesel-fuelled engine.

In our WO 03/033118 (incorporated herein by reference) we disclose an exhaust system for an internal combustion engine comprising a first lean $NO_x$ catalyst (LNC) comprising a metal on a support comprising alumina, titania, zirconia, non-zeolite silica alumina or mixtures or mixed oxides of any two or more thereof and a second, platinum-based LNC disposed with and/or downstream of the first LNC, wherein the exhaust system comprises means for coking the first LNC during normal engine operation. The invention of PCT/GB2004/001680 is novel over this disclosure for similar reasons to EP 0541271.

U.S. Pat. No. 6,202,407 (incorporated herein by reference) describes a method of catalytically reducing $NO_x$ to $N_2$, i.e. lean $NO_x$ catalysis, using pulsed injection of hydrocarbon reductant. Preferred catalysts are amphoteric and include gamma-alumina, $Ga_2O_3$ and $ZrO_2$, all optionally metallised with Cu, Ni or Sn.

A problem with the use of oxidation catalysts and catalysed soot filters is that, as exhaust emission legislation tightens, legislative bodies have begun to discuss limiting the amount of $NO_2$ it is permissible to exhaust to atmosphere. For example, the California Air Resources Board (CARB) has proposed that a maximum of 20% of tailpipe $NO_x$ of the relevant drive cycle is emitted as $NO_2$ (See California's Diesel Risk Reduction Program, September 2000 and Title 13, California Code of Regulations, Chapter 14, section 2706.). $NO_2$ is toxic and can cause headaches, dizziness and nausea in low doses. It also has an objectionable smell. In the context of the CRT®, if there is insufficient PM on the filter to react with $NO_2$ generated over the oxidation catalyst or the temperature of the exhaust gas is below a preferred range for combustion of PM in $NO_2$, $NO_2$ can slip past the filter and be undesirably exhausted to atmosphere.

This problem is particularly acute when internal combustion engines are used in confined spaces, such as mines, where vehicles are used to drill for, load, and transport mined material to the surface. Many mining operations generate PM, and so exhaust aftertreatment systems comprising filters for reducing the levels of PM emitted are being considered. Furthermore, explosives used to blast rock to recover a desired ore can generate $NO_2$. Accordingly, it would be an advantage to reduce the exhaust gas emissions of both PM and $NO_2$ to the atmosphere in closed environments to improve the health and safety of miners. Indeed, the US Mine Safety and Health Administration prevents the use of diesel exhaust systems comprising diesel particulate filter systems that increase $NO_2$ emissions.

SUMMARY OF THE INVENTION

In developing the method of PCT/GB2004/001680 for practical application, we have discovered a way of utilising the observation that coke formation on the acidic metal oxide materials promotes the decomposition of $NO_2$ to NO. In particular, we have observed that conversion can be maintained by ensuring that the catalyst remains coked. In effect, the catalyst can be used as a reservoir for a HC reductant, and this has a number of useful advantages for the practical application of the invention.

According to a first aspect, the invention provides a method of decomposing nitrogen dioxide ($NO_2$) to nitrogen monoxide (NO) in an exhaust gas of a lean-burn internal combustion engine, which method comprising the steps of contacting an acidic metal oxide selected from the group consisting of zeolites, tungsten-doped titania, silica-titania, zirconia-titania, gamma-alumina, amorphous silica-alumina and mixtures of any two or more thereof with a gas mixture comprising the exhaust gas, adjusting the composition of the gas mixture by injecting hydrocarbon therein at a rate that changes over the course of a duty cycle so that, on average over the duty cycle, the C1 hydrocarbon:nitrogen oxides (C1 HC:$NO_x$) ratio of the gas mixture contacting the acidic metal oxide is from 0.1 to 2.0 and passing the effluent gas directly to atmosphere optionally via first contacting the gas mixture with a hydrocarbon oxidation catalyst.

In one embodiment, HC is injected intermittently into the gas mixture over the course of the duty cycle. In another embodiment, HC is injected continuously into the gas mixture in pulses oscillating between a lower rate of injection and a higher rate of injection over the course of the duty cycle.

By averaging the supply of HC reductant over the duty cycle of the engine, it is possible to use higher flow pumps and injectors to deliver HC intermittently or in pulses from lower to higher rates of delivery, relying on the ability of the catalyst to store the HC as coke for use in the method of the invention. This is advantageous because higher rate flow pumps are more readily available and it is possible to use commercially available injectors.

A second advantage is that it is more difficult to deliver low rates of HC injection continuously, so by injecting larger amounts of HC intermittently and using the catalyst to store the HC, the overall accuracy of HC delivery is improved.

A third advantage is that by using the HC storage capability of the catalyst, it is possible to simplify the system to a single injection point, making calibration control cheaper and easier, for example in an at least two segment engine map embodiment discussed below. The ability of the catalyst to store HC reductant as coke reduces or prevents excessive HC emissions to atmosphere, and certainly enables the system to meet the relevant emission standards, even when using an intermittent HC delivery strategy. This can be important in a mining facility.

BRIEF DESCRIPTION OF THE DRAWINGS

An aspect of the invention is described below in connection with the accompanying drawing, in which.

DETAILED DESCRIPTION OF THE INVENTION

Figure 1:
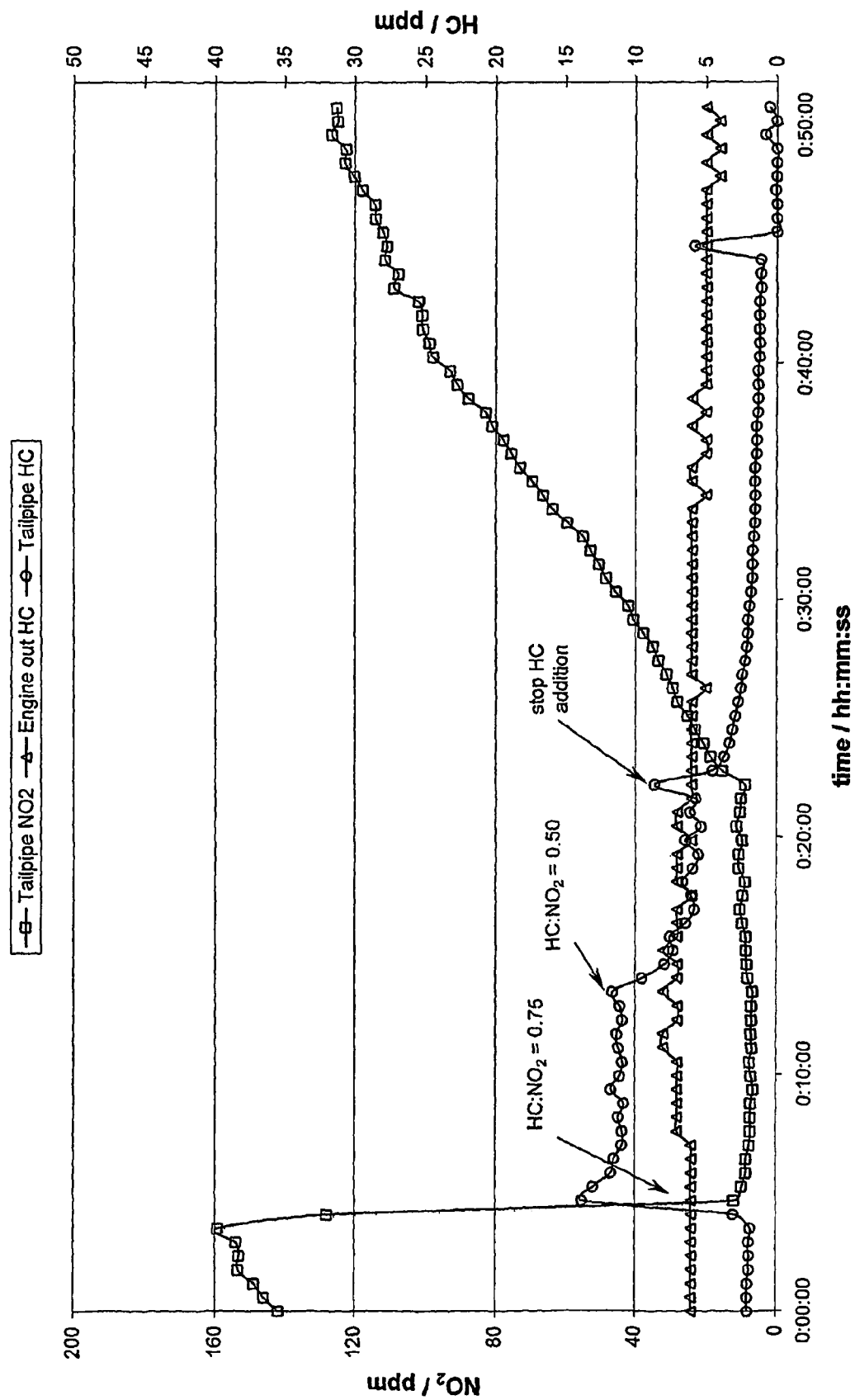
FIG. 1 is a graph showing $NO_2$ emissions from an exhaust system before, during and after a period of HC injection.

In one embodiment, the C1 HC:$NO_x$ ratio is adjusted to from 0.1 to 1.5 or from 0.1 to 1.0.

In an embodiment, the acidic metal oxide is non-metallised, but it can also support a metal or metal compound wherein the metal is selected from the group consisting of rhodium, palladium, iron, copper and mixtures of any two or more thereof. In a further embodiment, the sole supported metal or metal compound is palladium.

$NO_2$ can account for up to about 50% $NO_x$ in the exhaust gas of an internal combustion engine. Therefore, according to one embodiment the C1 HC:$NO_2$ ratio is adjusted to from 0.05 to 1.00, such as from 0.05 to 0.75 or 0.05 to 0.50 over the course of the duty cycle.

In an embodiment, HC injection is controlled in response to at least one input selected from the group consisting of: exhaust gas temperature; catalyst bed temperature; exhaust gas mass flow; $NO_2$ in the exhaust gas; manifold vacuum; ignition timing; engine speed; throttle position; lambda value of the exhaust gas composition; quantity of fuel injected in the engine; position of an exhaust gas recirculation valve; turbocharger boost pressure; HC concentration downstream of the $NO_2$ decomposition catalyst; and the rate of change of any thereof. In another embodiment, HC injection is controlled by correlation with the at least one input in stored look-up tables or an engine map. Sophisticated modelling can be used to predict engine-out total $NO_x$ and $NO_2$ downstream of an oxidation catalyst in order to develop an appropriate HC injection strategy.

For example, in one embodiment the at least one input includes engine speed and exhaust gas temperature, there being a correlation between engine speed and engine-out $NO_x$.

In an embodiment where an engine map is used to correlate the at least one input with the rate and/or quantity of HC injection, the engine map can be divided into at least two segments and a quantity of HC can be injected into the exhaust gas whenever a detected input value crosses from one segment into the other. In further embodiments, the engine map can be subdivided into four segments, sixteen segments or two hundred and fifty six segments, for example.

We have found that for the prescribed C1 HC:$NO_x$ ratios, $NO_2$ conversion is reduced at lower temperatures. In order to meet the proposed CARB threshold of a maximum of 20% $NO_2$ of $NO_x$ emitted, in one embodiment we prefer that the step of adjusting the C1 HC:$NO_x$ ratio is performed only when the exhaust gas temperature is at 250° C. and above. It will be noted that $NO_2$ conversion is possible at temperatures much below that required for lean $NO_x$ catalysis for a similar catalyst i.e. above 250° C. for $NO_2$ conversion as opposed to about 400° C. for lean $NO_x$ catalysis over Fe-Beta zeolite.

According to a further embodiment, the step of adjusting the C1 HC:$NO_x$ ratio is done when the exhaust gas temperature is in a range that has been pre-determined to produce increased $NO_2$ in the exhaust system. Such temperature range will usually depend on the engine type and the duty of the vehicle. Illustrative embodiments include city centre buses comprising heavy-duty diesel engines (250-300° C.); buses in non-city centre locations (up to 400° C.); and heavy-duty diesel trucks (up to 500° C.).

Potentially, the method according to the first aspect of the invention can be used to treat gas mixtures including $NO_2$ generated by any chemical, e.g. industrial, process. However, for the purposes of the present invention, the method is for treating an exhaust gas mixture derived from combustion of a hydrocarbon fuel, such as diesel fuel, gasoline fuel, a gas-to-liquid (GTL)-based fuel, natural gas (NG) or liquid petroleum gas (LPG) in an internal combustion engine.

According to a second aspect, the invention provides an exhaust system for an internal combustion engine, which system comprising a catalyst for decomposing nitrogen dioxide ($NO_2$) to nitrogen monoxide (NO) with a hydrocarbon (HC) reductant, and means, in use, for adjusting the composition of an exhaust gas by injecting HC therein at a rate that changes over the course of a duty cycle so that, on average over the duty cycle, the C1 hydrocarbon:nitrogen oxides (C1 HC:$NO_x$) ratio of the exhaust gas composition contacting the catalyst is from 0.1 to 2.0, wherein the catalyst consists of an acidic metal oxide selected from the group consisting of zeolites, tungsten-doped titania, silica-titania, zirconia-titania, gamma-alumina, amorphous silica-alumina and mixtures of any two or more thereof optionally supporting a metal or a compound thereof, which metal being selected from the group consisting of rhodium, palladium, iron, copper and mixtures of any two or more thereof, wherein effluent gas from the catalyst is passed directly to atmosphere optionally via a hydrocarbon oxidation catalyst.

Control of the adjustment means can be effected, in use, by suitable means for putting the method steps of the invention into effect comprising, in one embodiment, a processor which in turn can form part of the engine control unit (ECU), if desired.

In one embodiment, the adjustment means controls HC injection so that, on average over the course of the duty cycle, the C1 hydrocarbon:nitrogen dioxide (C1 HC:$NO_2$) ratio of the exhaust gas composition contacting the catalyst is from 0.05 to 1.00.

In order to control HC injection, it is desirable that the system comprises one or more sensors for inputting the status of one or more of the following conditions in the system: exhaust gas temperature; catalyst bed temperature; exhaust gas mass flow; $NO_2$ in the exhaust gas, e.g. as detected by a suitable $NO_2$ sensor; manifold vacuum; ignition timing; engine speed; throttle position; lambda value of the exhaust gas composition; quantity of fuel injected in the engine; position of an exhaust gas circulation valve; turbo-charger boost pressure; HC concentration downstream of the $NO_2$ decomposition catalyst; and the rate of change of any thereof.

It will be understood that the C1 HC:$NO_x$ ratio can be varied according to the or each input received. For example, at lower exhaust gas temperatures a higher C1 HC:$NO_x$ ratio is desirable for a pre-determined $NO_2$ conversion, whereas a lower C1 HC:$NO_x$ ratio can be used at higher temperatures.

In one embodiment, the $NO_2$ decomposition catalyst is disposed downstream of an oxidation catalyst comprising at least one PGM, preferably at least one of platinum and palladium, especially platinum only. It is known from EP 0341832 or U.S. Pat. No. 4,902,487 that such catalysts can oxidise NO in the exhaust gas to $NO_2$ at temperatures of up to 400° C. However, preferably, where additional HC is introduced into the exhaust system upstream of the $NO_2$ decomposition catalyst, this is done downstream of the oxidation catalyst. This is because HC can be combusted on the oxidation catalyst before it reaches the $NO_2$ decomposition catalyst if the exhaust gas composition over the oxidation catalyst is lambda >1. Whilst it is possible to slip HC past the oxidation catalyst for $NO_2$ decomposition if the exhaust gas composition over the oxidation catalyst is at lambda <1, the amount of HC required is prohibitive and accurate control of HC delivery to the catalyst is complicated. In the CRT® configuration, HC injection can be effected between the oxidation catalyst and the filter, or between the filter and a downstream $NO_2$ decomposition catalyst.

According to a further embodiment, the oxidation catalyst is on a diesel particulate filter. Such arrangement is sometimes called a "catalysed soot filter" or CSF. The catalyst can promote the combustion, i.e. reduce the combustion temperature, of PM on the filter. However, the presence of an oxidation catalyst on the filter can also result in increased levels of $NO_2$ leaving the filter section of the filter relative to the amount of $NO_2$ entering the filter.

According to a further embodiment, the oxidation catalyst is associated with a $NO_x$ absorbent material. The $NO_x$ absorbent material is typically at least one compound of an alkali metal, e.g. potassium or caesium, at least one compound of an alkaline earth metal, such as barium, strontium or calcium, or at least one compound of a rare earth metal, for example lanthanum or yttrium. Generally, the compounds of the $NO_x$ absorbent materials will be oxides but, in use, the compounds may also be present as hydroxides, carbonates or, following $NO_x$ absorption (as will be described hereinafter), nitrates.

In this arrangement, $NO_2$ generated over the oxidation catalyst during lambda >1 operation can be absorbed in the $NO_x$ absorbent material and stored as the nitrate. Since the $NO_x$ absorbent material has a finite capacity to absorb $NO_x$, periodically the $NO_x$ absorbent material is regenerated, i.e. to remove the stored $NO_x$. Generally, this is done in practice by transiently adjusting the lambda composition of the exhaust gas to reduce the concentration of $O_2$ in the gas, for example by introducing additional HC fuel into the exhaust gas or by allowing less air into the combustion mixture. The nitrate forms of the alkali, alkaline earth and rare earth metals are understood to be unstable in rich exhaust gas, and so $NO_x$ is released, in what is believed to be a mixture of at least NO and $NO_2$.

Typically, compositions comprising $NO_x$ absorbent materials also comprise rhodium for reducing the $NO_x$ to $N_2$ in the presence of the reductant. However, the rhodium $NO_2$ decomposition catalysts of the present invention do not include other PGM's such as platinum and/or palladium commonly used as oxidation catalysts. In one arrangement, for example, the $NO_2$ decomposition catalyst is on a separate monolith downstream of the filter. In a particular embodiment, however, the $NO_2$ decomposition catalyst can be disposed on a downstream end of the filter, e.g. in a stripe configuration. For example, in an embodiment featuring the CRT® system, the $NO_2$ decomposition catalyst can be disposed, e.g. as a stripe, on the downstream end of the filter and the HC can be injected between the oxidation catalyst and the filter.

In embodiments including the hydrocarbon oxidation catalyst downstream of the $NO_2$ decomposition catalyst for controlling HC slip to atmosphere, the HC oxidation catalyst can comprise at least one PGM, but in a particular embodiment the PGM consists solely of platinum. The HC oxidation catalyst can be disposed on a separate monolith, or on the monolith comprising the $NO_2$ decomposition catalyst eg. in a stripe configuration. In an arrangement wherein the $NO_2$ decomposition catalyst is present as a stripe, the HC oxidation catalyst stripe is downstream thereof.

The filter can be any suitable substrate including a wall-flow filter of ceramic material such as silicon carbide or cordierite. Alternatively, it can be the device described in either EP 1057519 or WO 03/038248 (both of which disclosures are incorporated herein by reference).

Examples of suitable zeolite components for the $NO_2$ decomposition catalysts are ZSM-5, β-zeolite, Y-zeolite or mordenite. Suitable silica to alumina molar ratios for such zeolites are from 25 to 400, optionally 30 to 80.

The silica-titania, zirconia-titania or tungsten-titania can be in the form of true mixed oxides or composite oxides. "Composite oxide" as defined herein means a largely amorphous oxide material comprising oxides of at least two elements which are not true mixed oxides consisting of the at least two elements. In embodiments, suitably the tungsten, silica or zirconia can be present in the tungsten-titania, silica-titania and zirconia-titania respectively in an amount of from 5 to 15 wt % based on the total weight of the acidic metal oxide.

The $NO_2$ decomposition catalysts supporting metals or compounds thereof can be prepared according to known methods such as wet impregnation of the at least one support material using a suitable metal salt followed by calcination, co-precipitation or by ion exchange.

In one embodiment, the catalyst for use in the exhaust system according to the invention contains from 0.1 to 5.0 wt % rhodium, such as from 0.25 to 2.5 wt % rhodium, based on the total weight of the acidic metal oxide.

In a specific embodiment, the catalyst consists essentially of 0.5 wt % rhodium on gamma-alumina.

In a further embodiment, the $NO_2$ decomposition catalyst contains from 1 to 10 wt % copper, such as from 2.5 to 7.5 wt % copper, based on the total weight of the acidic metal oxide.

Where the acidic metal oxide is a zeolite, the metal can be impregnated, ion exchanged or co-precipitated onto the acidic metal oxide.

In a specific embodiment the catalyst consists essentially of 5 wt % copper on zeolite ZSM-5 and/or β-zeolite.

In a further embodiment, the catalyst contains from 1 to 10 wt % iron, such as from 2.5 to 7.5 wt % iron, based on the total weight of the acidic metal oxide. Where the acidic metal oxide is a zeolite, the metal can be impregnated, ion exchanged or co-precipitated onto the acidic metal oxide.

In a specific embodiment the catalyst consists essentially of 5 wt % iron and the at least one support is zeolite ZSM-5 and/or β-zeolite.

According to a further embodiment, the catalyst contains from 0.1 to 5.0 wt % palladium, such as from 0.25 to 2.5 wt % palladium, based on the total weight of the acidic metal oxide.

In a specific embodiment the catalyst consists essentially of 2 wt % palladium on tungsten-titania.

According to a third aspect, the invention provides an apparatus comprising an internal combustion engine and an exhaust system according to the invention.

The engine of such an apparatus can be fuelled with diesel fuel, gasoline fuel, a gas-to-liquid (GTL)-based fuel, natural gas (NG) or liquid petroleum gas (LPG), preferably diesel fuel. The fuel that powers the engine is normally used as the HC reductant in the method according to the present invention. However, it is envisaged that a different HC reductant from the fuel that powers the engine can be used if a suitable reservoir and delivery means is installed and means are provided for replenishing depleted HC reductant.

EXAMPLES

In order that the invention may be more fully understood the following Examples are provided by way of illustration only.

Example 1

Trials were undertaken to investigate the $NO_2$ decomposition rates achievable over the range of temperatures using a stationary apparatus comprising a Deutz 34 kW diesel engine and an exhaust system comprising a CRT® followed by an air assisted HC injector and a $NO_2$ decomposition catalyst consisting of non-metallised beta-zeolite washcoated on a 400 cells per square inch (cpsi (62 cells $cm^{-2}$)) 7½ inch (19.05 cm) diameter×3 inch (7.62 cm) long ceramic monolith substrate (clean-up catalyst). The HC injector is connected to an air pump to optimise diesel fuel injection delivery and spray distribution. The engine speed was held at 2900 rpm with CRT® catalyst inlet temperature at 355° C. and the inlet temperature to the $NO_2$ decomposition catalyst about 25° C. lower. The $NO_2$ concentration in the exhaust gases was increased from 30 ppm to 150 ppm by the CRT® system. Using a fuel injection rate between the CRT® catalyst and the $NO_2$ decomposition catalyst to give a C1 HC:$NO_2$ ratio of 0.5, tailpipe $NO_2$ was reduced to 15 ppm, i.e. less than the concentration of $NO_2$ from the engine (results not shown). The engine speed and load were then reduced to give an inlet temperature to the $NO_2$ decomposition catalyst of 243° C. The tailpipe $NO_2$ level rose to 90 ppm but, on increasing the HC injection rate to give a 1:1 ratio of C1 HC:$NO_2$, the tailpipe $NO_2$ was reduced to 10 ppm. This observation is consistent with the bench engine results shown in PCT/GB2004/001680 wherein low temperature conversion of $NO_2$ could be enhanced at higher C1 HC:$NO_2$ ratios.

FIG. 1 shows results from an experiment using the Deutz compressor to optimise diesel fuel injection rate. The engine was run at a set speed and load and diesel fuel was added upstream of the $NO_2$ decomposition catalyst to give a C1 HC:$NO_2$ ratio of 0.75. This gave a very low level of tailpipe $NO_2$ and so the diesel fuel injection rate was reduced to give a C1 HC:$NO_2$ of 0.5. The tailpipe $NO_2$ level increased slightly and after a few minutes the diesel injection was switched off. It can be seen that the tailpipe $NO_2$ level only increased slowly over several minutes before it reached the same level as the inlet to the $NO_2$ decomposition catalyst, demonstrating the considerable storage potential of the catalyst in this system.

To determine whether coked HC deposits might build up on the $NO_2$ decomposition catalyst if the HC level was in excess, back pressure was monitored at several points over a system using a high C1 HC:$NO_2$ injection ratio of 1.5, i.e. outside the range of the present invention. Back pressure before the CRT® system and the $NO_2$ decomposition catalyst remained constant at 30-35 mbar and 6-8 mbar respectively over 10 hours of continuous running at a steady state condition.

Furthermore, tailpipe HC levels were measured with no $NO_2$ decomposition catalyst in place to ascertain maximal HC emissions and how detected emissions related to current emission standards. A typical engine-out HC concentration for this engine was 5-10 ppm. After the CRT® catalyst this was reduced to approximately 2 ppm as shown in FIG. 1. With fuel injection to give a typical HC to $NO_2$ ratio of 0.5, the tailpipe HC level was slightly lower than engine-out. Good $NO_2$ decomposition was observed under this condition.

Example 2

A CRT® system consisting of an oxidation catalyst followed by a particulate filter, followed by a diesel fuel injector and then a beta-zeolite $NO_2$ decomposition catalyst similar to that described in Example 1, was fitted to an engine in a laboratory. The engine was a 1994 US, turbo-charged, 12 liter, 303 kW Volvo.

The $NO_2$ decomposition catalyst coated on a ceramic monolith substrate, 7.5 inch (19.05 cm) diameter×3 inch (7.62 cm) long, with 400 cells per square inch (cpsi (62 cells $cm^{-2}$)) was evaluated as described below. The performance was compared to that of a $NO_2$ decomposition catalyst of the same diameter but 6 inches (15.24 cm) long.

The engine was run at a steady speed of 1200 rpm and the load increased to raise the inlet temperature of the oxidation catalyst in the CRT®. The temperature was increased in approximately 50° C. steps from 200-475° C. and the $NO_2$, HC (ppm) and Particulate Matter (PM) (g $hr^{-1}$) were measured at each temperature point, before and after the $NO_2$ decomposition catalyst. Fuel was injected into the $NO_2$ decomposition catalyst at a number of ratios of C1:$NO_2$ to determine the maximum $NO_2$ conversion (minimum slip). The results show data generated with C1:$NO_2$ ratios of 1.0 and 1.5 at three temperature points and are summarised in Table 1.

From the data shown in Table 1, it can be seen that the $NO_2$ conversion of the $NO_2$ decomposition catalyst increases with increasing temperature and, for the smaller catalyst, increases with the higher C1:$NO_2$ ratio. With the larger, 6 inch catalyst the $NO_2$ conversion is higher at all temperature points and is unaffected by the additional HC injected at the C1:1.5 HC to $NO_2$ ratio. From 315° C. greater than 90% conversion of $NO_2$ is achieved. Although there is increased HC slip at the higher injection ratio, under all operating conditions, the post decomposition catalyst HC is much less with the larger catalyst volume. PM conversion is greater than 85% under all conditions irrespective of HC injection ratio except for the larger 6 inch catalyst at the highest temperature.

TABLE 1

| Catalyst System | Inlet Temperature ° C. | | | | | | | | | C1:NO$_2$ Ratio |
|---|---|---|---|---|---|---|---|---|---|---|
| | 250 | | | 315 | | | 375 | | | |
| | HC Slip ppm | NO$_2$ conversion % | PM conversion % | HC Slip ppm | NO$_2$ conversion % | PM conversion % | HC Slip ppm | NO$_2$ conversion % | PM conversion % | |
| CRT + 3" | 42 | 57 | 97 | 67 | 76 | 91 | 53 | 89 | 92 | 1:1 |
| CRT + 3" | 72 | 65 | 96 | 111 | 82 | 90 | 78 | 98 | 91 | 1:1.5 |
| CRT + 6" | 25 | 83 | 97 | 43 | 92 | 87 | 36 | 99 | 74 | 1:1 |
| CRT + 6" | 61 | 81 | 92 | 85 | 91 | 85 | 71 | 97 | 65 | 1:1.5 |

Example 3

A second set of tests was conducted, using the system described in Example 2, to evaluate the effect of coating the rear end of the 6 inch (15.24 cm) long beta-zeolite NO$_2$ decomposition catalyst with a "stripe" of Pt catalyst. These second set of tests were designed to investigate the possibility of removing HC slip without re-oxidising NO to NO$_2$. Three samples of catalyst were coated with a 1 inch (25.4 cm) stripe of Pt at the rear of the decomposition catalyst at Pt loadings of 1, 5 and 10 g ft$^{-3}$ Pt.

The engine was run at a steady speed of 1200 rpm and the same test procedure used as in Example 2, PM was only measured at one test point (370° C.) and fuel injection to the decomposition catalyst was conducted with a C1:NO$_2$ ratio of 1.0 only. The HC slip and NO$_2$ conversions at three temperature points are summarised in Table 2, from which it can be seen that the addition of the Pt stripe to the decomposition catalyst improves overall PM conversion, compared with the arrangement wherein no Pt stripe is present, without significantly affecting HC slip or NO$_2$ conversion. This improvement in conversion efficiency corresponds to a greater than 60% reduction in the PM emissions at the tailpipe, i.e. of gases emitted directly to the atmosphere. This is probably because HC is removed which would contribute to soluble organic fraction (SOF) in the particulate. There is no significant effect of Pt loading of the stripe on performance of the decomposition catalyst.

Example 4

A Liebherr 922, 6 liter, 106 Kilowatt engine fitted to a Track Excavator was equipped with a CRT® system, similar to that described in Example 2, followed by a diesel fuel injector and then a beta-zeolite NO$_2$ decomposition catalyst. Two sizes of NO$_2$ decomposition catalyst were tested, both coated on ceramic substrate containing 400 cpsi (62 cpcm$^{-2}$): (i) 7.5 inch (19.05 cm) diameter×3 inch (7.62) cm long, of volume 132.5 in$^3$ (2.17 liter); and (ii) 5.55 inch (14.1 cm) diameter×6 inch (15.24 cm) long, of volume 145 in$^3$ (2.37 liter).

The vehicle was maintained in a stationary position during testing and the inlet temperature to the catalyst system was increased by increasing engine speed and applying a load on the engine. In these experiments the engine was operated at 2100 rpm with and without load and HC fuel was injected at 180 ml h$^{-1}$ for catalyst (i) and 150 ml h$^{-1}$ for catalyst (ii). The NO$_2$ and HC (ppm) were measured before and after the decomposition catalysts and the results for NO$_2$ and HC measurements taken after the catalyst are summarised in Table 3.

From the results presented in Table 3, it can be seen that the percentage reduction in NO$_2$ over the decomposition catalyst increases with increasing temperature. With secondary fuel injection, higher levels of NO$_2$ conversion are achieved. The resulting HC slip shows that the injection of secondary fuel must be regulated to take into account characteristics such as catalyst volume, injector distribution and fuel flow properties to minimise HC slip while maintaining a desired high level of NO$_2$ removal.

TABLE 2

| Pt loading gft$^{-3}$ | Inlet Temperature ° C. | | | | | | | |
|---|---|---|---|---|---|---|---|---|
| | 250 | | 315 | | 370 | | | |
| | HC Slip ppm | NO$_2$ conversion % | HC Slip ppm | NO$_2$ conversion % | HC Slip ppm | NO$_2$ conversion % | PM conversion % | |
| 0 | 28 | 84 | 32 | 97 | 18 | 98 | 90 | |
| 1 | 23 | 99 | 24 | 99 | 23 | 99 | 97 | |
| 5 | 27 | 98 | 27 | 98 | 24 | 95 | 97 | |
| 10 | 20 | 99 | 23 | 99 | 28 | 99 | 97 | |

TABLE 3

| Catalyst | HC Injection ml h-1 | Temperature ° C. | NO$_2$ | | HC Slip ppm |
|---|---|---|---|---|---|
| | | | ppm | Conversion % | |
| (i) | 0 | 272 | 77 | 26 | 10 |
| (i) + load | 0 | 350 | 90 | 40 | 7 |

TABLE 3-continued

| Catalyst | HC Injection ml h-1 | Temperature °C. | NO$_2$ ppm | Conversion % | HC Slip ppm |
|---|---|---|---|---|---|
| (ii) | 180 | 282 | 45 | 56 | 57 |
| (ii) + load | 180 | 380 | 30 | 67 | 60 |
| (ii) | 150 | 286 | 27 | 74 | 105 |
| (ii) + load | 150 | 380 | 20 | 87 | 102 |

The invention claimed is:

1. A method of decomposing nitrogen dioxide (NO$_2$) to nitrogen monoxide (NO) in an exhaust gas of a lean-burn internal combustion engine, said method comprising the steps of contacting an acidic metal oxide selected from the group consisting of a zeolite, tungsten-doped titania, silica-titania, zirconia-titania, and mixtures of any two or more thereof, with a gas mixture comprising the exhaust gas; adjusting the composition of the gas mixture by injecting hydrocarbon therein at a rate that changes over the course of a duty cycle so that, on average over the duty cycle, the C1 hydrocarbon:nitrogen oxides (C1 HC:NO$_x$) ratio of the gas mixture contacting the acidic metal oxide is from 0.1 to 1.5; and passing the effluent gas directly to atmosphere or to atmosphere first via contacting the gas mixture with a hydrocarbon oxidation catalyst, wherein the hydrocarbon is diesel fuel, gasoline fuel, a gas-to-liquid (GTL)-based fuel or a liquid petroleum gas (LPG).

2. A method according to claim 1, wherein the adjusting step comprises injecting the hydrocarbon intermittently into the gas mixture over the course of the duty cycle.

3. A method according to claim 1, wherein the adjusting step comprises injecting the hydrocarbon continuously into the gas mixture in pulses oscillating between a lower rate of injection and a higher rate of injection over the course of the duty cycle.

4. A method according to claim 1, wherein the adjusting step comprises adjusting the C1 HC:NO$_2$ ratio in the gas mixture contacting the acidic metal oxide to, on average, from 0.05 to 1.00 over the course of the duty cycle.

5. A method according to claim 1, comprising controlling the hydrocarbon injection in response to at least one input selected from the group consisting of: exhaust gas temperature; catalyst bed temperature; exhaust gas mass flow; NO$_2$ in the exhaust gas; manifold vacuum; ignition timing; engine speed; throttle position; lambda value of the exhaust gas composition; quantity of fuel injected in the engine; position of an exhaust gas recirculation valve; turbo-charger boost pressure; HC concentration downstream of the NO$_2$ decomposition catalyst; and the rate of change of any thereof.

6. A method according to claim 5, wherein the controlling step comprises controlling the hydrocarbon injection by correlation with the at least one input in stored look-up tables or an engine map.

7. A method according to claim 6, comprising dividing the engine map into at least two segments and injecting a quantity of the hydrocarbon into the exhaust gas whenever a detected input value crosses from one segment to the other.

8. A method according to claim 5, wherein adjusting the C1 HC:NO$_x$ ratio is done at above 250° C.

9. A method according to claim 8, wherein adjusting the C1 HC: NO$_x$ ratio is done at up to 500° C.

10. A method according to claim 1, wherein said acidic metal oxide supports a metal or compound thereof, said metal selected from the group consisting of rhodium, palladium, iron, copper and mixtures of any two or more thereof.

11. An exhaust system for a lean-burn internal combustion engine, which system comprising a catalyst for decomposing nitrogen dioxide (NO$_2$) to nitrogen monoxide (NO) with a diesel fuel reductant, a source of hydrocarbon reductant and means, in use, for adjusting the composition of an exhaust gas by injecting the hydrocarbon therein at a rate that changes over the course of a duty cycle so that, on average over the duty cycle, the C1 hydrocarbon:nitrogen oxides (C1 HC:NO$_x$) ratio of the exhaust gas composition contacting the catalyst is from 0.1 to 1.5, wherein the catalyst consists of an acidic metal oxide (C1 selected from the group consisting of a zeolite, tungsten-doped titania, silica-titania, zirconia-titania, and mixtures of any two or more thereof, wherein effluent gas from the catalyst is passed directly to atmosphere or to atmosphere first via a hydrocarbon oxidation catalyst and wherein the hydrocarbon reductant is diesel fuel, gasoline fuel, a gas-to-liquid (GTL)-based fuel or liquid petroleum gas (LPG).

12. An exhaust system according to claim 11, wherein the adjusting means, in use, injects hydrocarbon intermittently into the exhaust gas over the course of the duty cycle.

13. An exhaust system according to claim 11, wherein the adjusting means, in use, injects hydrocarbon continuously in pulses oscillating between a lower rate of injection and a higher rate of injection over the course of the duty cycle.

14. An exhaust system according to claim 11, wherein the adjusting means, in use, adjusts the composition of the exhaust gas by injecting hydrocarbon therein so that, on average over the course of the duty cycle, the C1 hydrocarbon:nitrogen dioxide (C1 HC:NO$_2$) ratio of the exhaust gas composition contacting the catalyst is from 0.05 to 1.00.

15. An exhaust system according to claim 11, wherein the adjusting means comprises a processor.

16. An exhaust system according to claim 11, further comprising an oxidation catalyst comprising at least one PGM, wherein the NO$_2$ decomposition catalyst is disposed downstream of the oxidation catalyst.

17. An exhaust system according to claim 16, further comprising a particulate filter between the oxidation catalyst and the NO$_2$ decomposition catalyst.

18. An exhaust system according to claim 16, further comprising a particulate filter, wherein the oxidation catalyst is on the particulate filter.

19. An exhaust system according to claim 11, wherein the acidic metal oxide is the zeolite selected from the group consisting of at least one of ZSM-5, β-zeolite, Y-zeolite and mordenite.

20. An apparatus comprising a diesel engine and an exhaust system according to claim 11.

21. A vehicle comprising an apparatus according to claim 20.

22. An exhaust system for a lean-burn internal combustion engine, which system comprising a catalyst for decomposing nitrogen dioxide (NO$_2$) to nitrogen monoxide (NO) with a diesel fuel reductant, a source of hydrocarbon reductant and means, in use, for adjusting the composition of an exhaust gas by injecting the hydrocarbon therein at a rate that changes over the course of a duty cycle so that, on average over the duty cycle, the C1 hydrocarbon:nitrogen oxides (C1 HC:NO$_x$) ratio of the exhaust gas composition contacting the catalyst is from 0.1 to 1.5, wherein the catalyst consists of an acidic metal oxide selected from the group consisting of a zeolite, tungsten-doped titania, silica-titania, zirconia-titania, and mixtures of any two or more thereof supporting a metal or a compound thereof, which metal being selected from the group consisting of rhodium, palladium, iron, copper and mixtures of any two or more thereof, wherein effluent gas from the catalyst is passed directly to atmosphere or to atmosphere first via a hydrocarbon oxidation catalyst and wherein the hydrocarbon reductant is diesel fuel, gasoline fuel, a gas-to-liquid (GTL)-based fuel or liquid petroleum gas (LPG).

* * * * *